(12) United States Patent
Takahashi et al.

(10) Patent No.: US 11,105,901 B2
(45) Date of Patent: Aug. 31, 2021

(54) SURVEYING INSTRUMENT AND METHOD FOR ASSEMBLING TOTAL STATION AND TWO-DIMENSIONAL LASER SCANNER

(71) Applicant: TOPCON Corporation, Tokyo-to (JP)

(72) Inventors: Naoto Takahashi, Tokyo-to (JP); Yasushi Tanaka, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 511 days.

(21) Appl. No.: 16/202,322

(22) Filed: Nov. 28, 2018

(65) Prior Publication Data
US 2019/0170861 A1 Jun. 6, 2019

(30) Foreign Application Priority Data

Dec. 5, 2017 (JP) .............................. JP2017-233172

(51) Int. Cl.
| | | |
|---|---|---|
| *H04B 10/00* | (2013.01) | |
| *G01S 7/481* | (2006.01) | |
| *G01S 17/42* | (2006.01) | |
| *G01C 15/00* | (2006.01) | |
| *G01S 17/86* | (2020.01) | |

(52) U.S. Cl.
CPC .......... *G01S 7/4817* (2013.01); *G01C 15/002* (2013.01); *G01S 7/4813* (2013.01); *G01S 17/42* (2013.01); *G01S 17/86* (2020.01)

(58) Field of Classification Search
CPC ...... G01S 7/4817; G01S 7/497; G01S 7/4813; G01S 17/42; G01S 17/86; G01S 17/66; G01C 15/002; G01C 15/004; G01C 15/006; G01C 15/008; G01C 3/008; H04B 10/112; H04B 10/1143; H04B 10/1149; H04B 10/40; H04B 10/116

USPC ....... 398/118, 119, 127, 128, 130, 129, 131, 398/169, 170, 135, 136, 137, 158, 159, 398/33; 356/4.01, 5.01, 3.01, 4.1, 5.1, 356/3.1, 4.03, 4.04; 33/290, 227, 228, 33/286
See application file for complete search history.

(56) References Cited

U.S. PATENT DOCUMENTS

| | | | |
|---|---|---|---|
| 2004/0207832 A1* | 10/2004 | Ohtomo | ............... G01C 15/002 356/4.01 |
| 2015/0052766 A1 | 2/2015 | Chiba et al. | |
| 2016/0259039 A1 | 9/2016 | Ohtomo et al. | |
| 2016/0320473 A1* | 11/2016 | Matsumoto | ............. G01S 17/42 |
| 2016/0349050 A1* | 12/2016 | Yoshino | ................. G01S 17/86 |
| 2016/0349051 A1 | 12/2016 | Kumagai et al. | |

FOREIGN PATENT DOCUMENTS

| | | |
|---|---|---|
| JP | 2015-40830 A | 3/2015 |
| JP | 2016-161411 A | 9/2016 |
| JP | 2016-223841 A | 12/2016 |

* cited by examiner

*Primary Examiner* — Hanh Phan
(74) *Attorney, Agent, or Firm* — Nields, Lemack & Frame, LLC

(57) ABSTRACT

Provided is a surveying instrument comprises a total station, a mounting base which is fixed on an upper surface of the total station at three points, and a two-dimensional laser scanner which is fixed on an upper surface of the mounting base at three points, wherein the total station is configured to perform a three-dimensional measurement of a measuring point by a first distance measuring light, wherein the two-dimensional laser scanner is configured to acquire point cloud data along a scanning line by a second distance measuring light.

19 Claims, 5 Drawing Sheets

US 11,105,901 B2

SURVEYING INSTRUMENT AND METHOD FOR ASSEMBLING TOTAL STATION AND TWO-DIMENSIONAL LASER SCANNER

BACKGROUND OF THE INVENTION

The present invention relates to a surveying instrument which can acquire a point cloud data of an object to be measured and a method for assembling a total station and a two-dimensional laser scanner.

As a surveying instrument, there is a total station or a three-dimensional laser scanner. The total station is used for measuring a point to be measured. The three-dimensional laser scanner acquires a shape of an object to be measured as a set of an infinite number of points each having a three-dimensional coordinate, that is, a three-dimensional point cloud data.

Although the three-dimensional laser scanner has a characteristic of being capable of measuring a three-dimensional shape of an object to be measured in a short time, the three-dimensional laser scanner is more expensive than the total station. To inexpensively manufacture the three-dimensional laser scanner, a two-dimensional laser scanner which performs the rotatory irradiation of the distance measuring light on one axis is mounted to the total station, and the three-dimensional point cloud data is acquired by the cooperation between the total station and the two-dimensional laser scanner.

However, since the total station and the two-dimensional laser scanner are devices different from each other, to mount the two-dimensional laser scanner to the total station, a rotation irradiating plane of the two-dimensional laser scanner must be placed on a vertical axis of the total station. Therefore, the total station and the two-dimensional laser scanner must be positioned, and a mounting operation takes a time.

SUMMARY OF THE INVENTION

It is an object of the present invention to provide a surveying instrument which enables easily mounting a two-dimensional laser scanner to a total station and to a method for assembling the total station and the two-dimensional laser scanner.

To attain the object as described above, a surveying instrument according to the present invention comprises: a total station, a mounting base which is fixed on an upper surface of the total station at three points, and a two-dimensional laser scanner which is fixed on an upper surface of the mounting base at three points, wherein the total station comprises a horizontal rotation driving unit for horizontally rotating the total station around a vertical axis as a center, a horizontal rotation detector for detecting a horizontal angle of the total station, a telescope unit incorporating a first distance measuring component, for sighting a predetermined measuring point, emitting a first distance measuring light, and performing a distance measurement, a first vertical rotation driving unit for vertically rotating the telescope unit around a horizontal axis as the center, a first vertical angle detector for detecting a vertical angle of the telescope unit, and a control module, wherein the control module is configured to perform a three-dimensional measurement of the measuring point based on a distance measurement result, a detection result of the horizontal rotation detector, and a detection result of the first vertical angle detector, wherein the two-dimensional laser scanner comprises a base, a second distance measuring component which is provided on the base for emitting the second distance measuring light, and performing the distance measurement, a scanning mirror for deflecting the second distance measuring light within a vertical plane, a second vertical rotation driving unit for vertically rotating the scanning mirror around a horizontal axis as the center, and a second vertical angle detector for detecting a vertical angle of the scanning mirror, wherein the second distance measuring light is scanned by the scanning mirror, and point cloud data is acquired along a scanning line.

Further, in the surveying instrument according to a preferred embodiment, the mounting base comprises a flange fixed to an upper surface of the total station on a lower side and a base plate fixed to the two-dimensional laser scanner on an upper side, wherein the mounting base is configured with the low rigidity with respect to the base.

Further, in the surveying instrument according to a preferred embodiment, one of the left and the right of the flange is fixed to two points, the other of the left and the right of the flange is fixed to one point, one of the left and the right of the base plate is fixed to one point, and the other of the left and the right the base plate is fixed to two points.

Further, in the surveying instrument according to a preferred embodiment, a conical receiving hole is formed in each of a central portion of an upper surface of the base plate and a central portion of a lower surface of the base, a spherical shaft member is interposed between the receiving holes, and the base plate and the base are fixed at three points with the shaft member sandwiched.

Further, in the surveying instrument according to a preferred embodiment, the mounting base is fixed to a mounting pin protruded on the upper surface of the total station, and an upper surface of the mounting pin is formed into a spherical surface.

Further, in the surveying instrument according to a preferred embodiment, a seat is interposed and bolted between the base and the base substrate, and one surface of the seat is formed into a spherical surface.

Further, in the surveying instrument according to a preferred embodiment, the control module allows the total station and the two-dimensional laser scanner to measure at least two reference measuring points respectively, and is configured to calibrate the total station and the two-dimensional laser scanner based on the measurement results of the reference measuring points.

Furthermore, a method for assembling a total station and a two-dimensional laser scanner according to a present invention comprises: having a total station, a mounting base fixed on an upper surface of the total station at three points, and a two-dimensional laser scanner fixed on an upper surface of the mounting base at three points, measuring at least two reference measuring points by the total station, measuring the two reference measuring points by the two-dimensional laser scanner, obtaining a difference between a measurement result of the two reference measuring points measured by the total station and a measurement result of the two reference measuring points measured by the two-dimensional laser scanner, and calibrating the total station and the two-dimensional laser scanner based on the difference.

According to the present invention, the surveying instrument comprises: a total station, a mounting base which is fixed on an upper surface of the total station at three points, and a two-dimensional laser scanner which is fixed on an upper surface of the mounting base at three points, wherein the total station comprises a horizontal rotation driving unit for horizontally rotating the total station around a vertical axis as a center, a horizontal rotation detector for detecting a horizontal angle of the total station, a telescope unit incorporating a first distance measuring component for sighting a predetermined measuring point, emitting a first distance measuring light, and performing a distance measurement, a first vertical rotation driving unit for vertically rotating the telescope unit around a horizontal axis as the center, a first vertical angle detector for detecting a vertical angle of the telescope unit, and a control module, wherein the control module is configured to perform a three-dimensional measurement of the measuring point based on a distance measurement result, a detection result of the horizontal rotation detector, and a detection result of the first vertical angle detector, wherein the two-dimensional laser scanner comprises a base, a second distance measuring component which is provided on the base for emitting the second distance measuring light, and performing the distance measurement, a scanning mirror for deflecting the second distance measuring light within a vertical plane, a second vertical rotation driving unit for vertically rotating the scanning mirror around a horizontal axis as the center, and a second vertical angle detector for detecting a vertical angle of the scanning mirror, wherein the second distance measuring light is scanned by the scanning mirror, and point cloud data is acquired along a scanning line. As a result, supporting each of the mounting base and the two-dimensional laser scanner at three points enables suppressing an influence based on a height of the mounting pin with respect to the base and a deformation of the mounting base, and the adjustment in the mounting and the accuracy raising can be greatly alleviated.

Further, according to the present invention, the method for assembling a total station and a two-dimensional laser scanner comprises: having a total station, a mounting base fixed on an upper surface of the total station at three points, and a two-dimensional laser scanner fixed on an upper surface of the mounting base at three points, measuring at least two reference measuring points by the total station, measuring the two reference measuring points by the two-dimensional laser scanner, obtaining a difference between a measurement result of the two reference measuring points measured by the total station and a measurement result of the two reference measuring points measured by the two-dimensional laser scanner, and calibrating the total station and the two-dimensional laser scanner based on the difference. As a result, the mounting base does not have to be highly-accurately manufactured, and accuracy for an assembling between the total station and the two-dimensional laser scanner does not have to be a high accuracy, and the workability can be improved.

DETAILED DESCRIPTION OF THE PREFERRED EMBODIMENT

Figure 1:
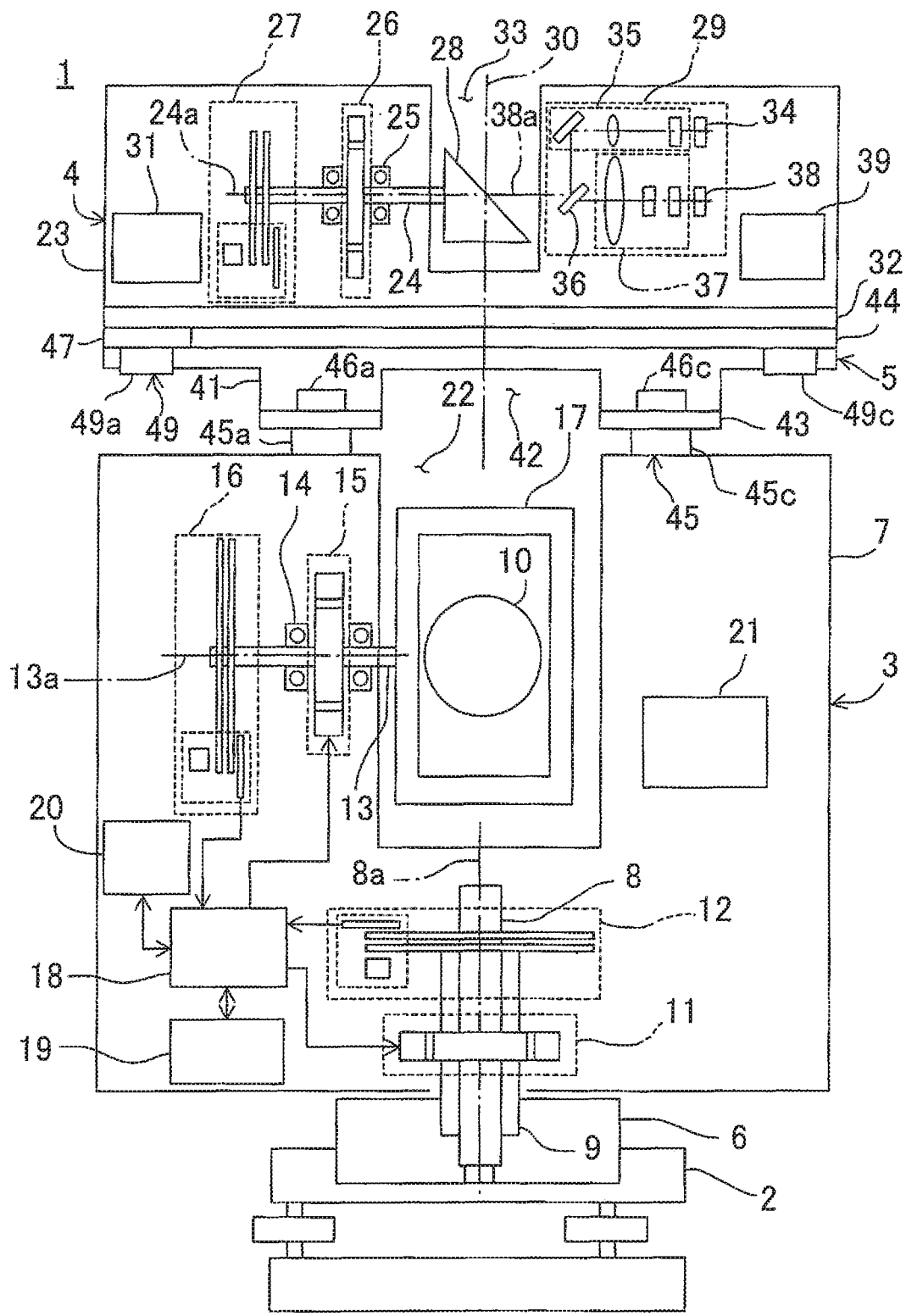
FIG. 1 is a front view showing a surveying instrument according to a first embodiment of the present invention.

A description will be given below on an embodiment of the present invention by referring to the attached drawings.

First, by referring to FIG. 1, a description will be given on a surveying instrument according to an embodiment of the present invention.

A surveying instrument 1 has a leveling unit 2 mounted on a tripod (not shown), a total station 3 as a first measuring unit mounted on the leveling unit 2, a two-dimensional laser scanner 4 as a second measuring unit mounted on the total station 3, and a mounting base 5 for mounting the two-dimensional scanner 4 to the total station 3.

The total station 3 comprises a fixed portion 6, a first frame 7, a horizontal rotation shaft 8, a horizontal rotation bearing 9, a horizontal rotation motor 11 as a first horizontal rotation driving unit, a horizontal angle encoder 12 as a horizontal rotation detector, a first vertical rotation shaft 13, a first vertical rotation bearing 14, a first vertical rotation motor 15 as a first vertical rotation driving unit, a first vertical angle encoder 16 as a first vertical angle detector, a telescope unit 17, a first control module 18, a storage module 19, a first communication module 20, an operation unit 21, and the like.

The total station 3 has a first measuring reference point. For instance, a point at which an optical axis of the telescope unit 17 (a first distance measuring optical axis) crosses an axis 13a of the first vertical rotation shaft 13 is assumed to be the first measuring reference point.

The horizontal rotation bearing 9 is fixed to the fixed portion 6. The horizontal rotation shaft 8 has a vertical axis 8a, and is rotatably supported by the horizontal rotation bearing 9.

Between the horizontal rotation bearing 9 and the frame 7, the horizontal rotation motor 11 is provided, and the horizontal rotation motor 11 is controlled by the first control module 18. The first control module 18 rotates the first frame 7 around the horizontal rotation shaft 8 as a center by the horizontal rotation motor 11.

A relative rotation angle of the frame 7 with respect to the fixed portion 6 is detected by the horizontal angle encoder 12. A detection signal from the horizontal angle encoder 12 is input to the first control module 18, and horizontal angle data is calculated by the first control module 18. The first control module 18 performs a feedback-control with respect to the horizontal rotation motor 11 based on the horizontal angle data.

On the frame 7, a first recessed portion 22 is formed. Further, on the upper surfaces of the parts facing each other with the first recessed portion 22 sandwiched, a predetermined number (three in the first embodiment, and FIG. 1 shows the mounting pins 45a and 45c alone) of cylindrical mounting pins 45 are provided in advance. A screw hole (not shown) is formed in each mounting pin 45. In a state where the two-dimensional laser scanner 4 has been removed, a handle (not shown) can be mounted with respect to the mounting pins 45 by the bolts. The handle is used for carrying the total station 3. Further, the first vertical rotation shaft 13 is freely rotatable provided to the frame 7 via the first vertical rotation bearing 14.

The first vertical rotation shaft 13 has the horizontal axis 13a. One end portion of the first vertical rotation shaft 13 extends into the first recessed portion 22, and the telescope unit 17 is fixed to the one end portion. Further, on an other end portion of the first vertical rotation shaft 13, the first vertical angle encoder 16 is provided.

The first vertical rotation motor 15 is provided on the first vertical rotation shaft 13, and the first vertical rotation motor 15 is controlled by the first control module 18. The first control module 18 rotates the first vertical rotation shaft 13 by the first vertical rotation motor 15. The telescope unit 17 is configured to rotate around the first vertical rotation shaft 13 as a center.

An elevation angle (a vertical angle) of the telescope unit 17 is detected by the first vertical angle encoder 16, and a detection result is input to the first control module 18. The first control module 18 calculates first vertical angle data of the telescope unit 17 based on a detection result of the first vertical angle encoder 16, and performs a feedback-control with respect to the first vertical rotation motor 15 based on the first vertical angle data.

The storage module 19 stores various types of measurement data. These measurement data include: the horizontal angle data and the first vertical angle data as calculated by the first control module 18, second vertical angle data which will be described later, the distance measurement results, and other measurement data. Further, in the storage module 19, various types of programs are stored. These programs include: a first distance measuring program for controlling the distance measurement as performed by a first distance measuring component (to be described later), a second distance measuring program for controlling the distance measurement as performed by a second distance measuring component 29 (to be described later), a first angle measuring program for calculating a direction angle of the total station 3 based on the detection results of the horizontal angle encoder 12 and the first vertical angle encoder 16, a second angle measuring program for calculating a direction angle of the two-dimensional laser scanner 4 based on the detection results of the horizontal angle encoder 12 and a second vertical angle encoder 27 (to be described later), a communication program for performing the communication between the total station 3 and the two-dimensional laser scanner 4, and a calibration program for performing the calibration of the first measuring reference point of the total station 3 and a second measuring reference point of the two-dimensional laser scanner 4, and other programs. The first control module 18 executes the programs as stored in the storage module 19, and executes the various types of processing using the total station 3 or both the total station 3 and the two-dimensional scanner 4.

Further, as the storage module 19, various types of storing means such as an HDD or a memory card and the like are used. The storage module 19 may be attachable or detachable with respect to the frame 7. Alternatively, the storage module 19 may be capable or sending data to an external storage device or an external data. processing device via communicating means as required.

The first communication module 20 can communicate with a second communication module 31 (to be described later) of the two-dimensional laser scanner 4 via the communicating means as required such as a wireless or a cable.

The operation unit 21 is, for instance, a touch panel, and enables inputting a setting of measuring conditions, an instruction to start and stop of the measurement, an instruction for performing the calibration of the total station 3 and the two-dimensional laser scanner 4 via the operation unit 21.

Next, a description will be given on the telescope unit 17.

The telescope unit 17 comprises a sighting telescope 10, and incorporates a first distance measuring component (not shown) as an electric distance meter. The first distance measuring component has a projecting unit (not shown) for projecting the distance measuring light in a direction orthogonal with respect to the axis 13a and a light receiving unit (not shown) for receiving the reflected distance measuring light as reflected by the object to be measured.

Based on a time difference between a light emission timing of the first distance measuring light as projected from the projecting unit and a light receiving timing of the reflected distance measuring light as received on the light receiving unit (that is, a reciprocating time of the first distance measuring light) and a light velocity, the first distance measuring component performs the distance measurement of the object to be measured. A distance measurement result is associated with the horizontal angle data and the first vertical angle data. Alternatively, the distance measurement result is stored in the storage module 19 as a coordinate value.

The two-dimensional laser scanner 4 is screwed on an upper surface of the total station 3 via the mounting base 5. Further, the two-dimensional laser scanner 4 comprises a second frame 23 having a second recessed portion 33 formed at a central portion, a second vertical rotation shaft 24, a second vertical rotation bearing 25, a second vertical rotation motor 26 as a second vertical rotation driving unit, the second vertical angle encoder 27 as a second vertical angle detector, a scanning mirror 28, the second distance measuring component 29 as an electric distance meter, the second communication module 31, a base 32, a second control module 39, and the like. The respective constituent elements of the two-dimensional laser scanner 4, for instance, the second distance measuring component 29 and the like are provided on the base 32. The second control module 39 executes various types of programs as stored in the storage module 19, and performs various types of processing using the two-dimensional laser scanner 4.

The two-dimensional laser scanner 4 has the second measuring reference point. The second measuring reference point is assumed to be, for instance, a point at which a distance measuring optical axis (a second distance measuring optical axis 38a) of the two-dimensional laser scanner 4 crosses an axis 24a of the second vertical rotation shaft 24. The axis 24a is concentric with the second distance measuring optical axis a and a reflection optical axis 30 crosses the axis 24a on a reflection surface of the scanning mirror 28. It is to be noted that, the storage module 19 and the operation unit 21 are used in common the two-dimensional scanner 4. On the other hand, a storage module and an operation unit may be additionally provided in the two-dimensional scanner 4. Further, the second control module 39 may be omitted, and the first control module 18 may be configured to control both the total station 3 and the two-dimensional laser scanner 4.

The two-dimensional laser scanner 4 is configured so as to rotate integrally with the total station 3 around the horizontal rotation shaft 8 as the center. The total station 3 and the two-dimensional laser scanner 4 are not finely adjusted. Therefore, the second measuring reference point of the two-dimensional laser scanner 4 does not necessarily coincide with the axis 8a of the horizontal rotation shaft 8. Further, the axis 13a is not necessarily parallel to the axis 24a. Therefore, a deviation is produced between the second measuring reference point and the axis 8a. Alternatively, a rotation irradiating plane (to be described later) is inclined with respect to the axis 8a. In this time, a deviation amount or an inclination amount is unknown. That is, a position of the second measuring reference point with respect to the first measuring reference point is unknown. Here, the reflection optical axis 30 extends in, for instance, the vertical direction, and passes through the second measuring reference point.

The second vertical rotation shaft 24 is rotatable supported by the second frame 23 via the second vertical rotation bearing 25. The axis 24a of the second vertical rotation shaft 24 is, for instance, horizontal. One end portion of the second vertical rotation shaft 24 extends into the second recessed portion 33, and the scanning mirror 28 is fixed to the one end portion. Further, on an other end portion of the second vertical rotation shaft 24, the second vertical angle encoder 27 is provided. The second vertical rotation motor 26 rotates the second vertical rotation shaft 24. The scanning mirror 28 is rotated around the axis 24a as a center via the second vertical rotation shaft 24.

A rotation angle of the scanning mirror 28 is detected by the second vertical angle encoder 27. A detection result is input to the first control module 18 via the second communication module 31 and the first communication module 20. The first control module 18 calculates second vertical angle data of the scanning mirror 28 based on the detection result, and performs a feedback-control with respect to the second vertical rotation motor 26 based on the second vertical angle data. It is to be noted that, the second vertical rotation shaft 24 is provided a high accuracy inclination sensor (not shown), for instance, a tilt sensor, and the first control module 18 can correct an axial deviation and the like at the time of the rotation based on a detection result of the inclination sensor.

Next, a description will be given on the second distance measuring component 29.

The second distance measuring light which is a pulsed light is emitted from a light emitter 34, and the second distance measuring light is projected via a light projecting optical system 35 and a beam splitter 36. The second distance measuring optical axis of the second distance measuring light as emitted from the beam splitter 36 coincides with the axis 24a, and the second distance measuring light is deflected at a right angle by the scanning mirror 28. When the scanning mirror 28 rotates around the axis 24a as the center, the second distance measuring light rotates (scans) within a plane (a rotation irradiating plane) orthogonal to the axis 24a. It is to be noted that, the second distance measuring light is not restricted to the pulsed light, and it may be the intermittent light described in, for instance, Japanese Unexamined Patent Application Publication No. 2016-461411.

The second distance measuring light reflected on the object to be measured (referred to as a "reflected distance measuring light" hereinafter) enters the scanning mirror 28. The reflected distance measuring light as deflected by the scanning mirror 28 is received by a photodetector 38 via the beam splitter 36 and a light receiving optical system 37. A light receiving signal as emitted from the photodetector 38 is input to the second control module 39.

Based on a time difference (that is, a reciprocating time of the pulsed light) between a light emission timing of the light emitter 34 and a light receiving timing of the photodetector 38 and a light velocity, the second control module 39 performs the distance measurement in accordance with each pulsed light of the second distance measuring light (Time of Flight). It is to be noted that, as a distance measuring method, the continuous light or the intermittent light may be projected as the distance measuring tight, and the distance measurement may be performed based on a phase difference between the emitted light and the reflected light.

It is to be noted that, an internal reference optical system (not shown) is provided to the second distance measuring component 29. A part of the second distance measuring light is divided, and the second distance measuring light as divided is received by the photodetector 38 via the internal reference optical system. When the distance measurement is performed based on a time difference between the light receiving timing of the distance measuring light received by the internal reference optical system and the light receiving timing of the reflected distance measuring light and a light velocity, the distance measurement of high-accuracy can be performed.

When the distance measurement is performed while rotating the scanning mirror 28 in the vertical direction, the second vertical angle data and distance measurement data can be obtained, and two-dimensional point cloud data can be acquired based on the second vertical angle data and the distance measurement data. Further, a horizontal angle at the time of acquiring the two-dimensional point cloud data is obtained by the horizontal angle encoder 12.

Further, in a state where the second vertical angle data of the scanning mirror 28 as calculated by the second control module 39 is associated with the distance measurement data as measured by the second distance measuring component 29, these data are transmitted to the total station 3 via the second communication module 31 and the first communication module 20. The second vertical angle data and distance measurement data as transmitted are stored in the storage module 19. Alternatively, the second vertical angle data and distance measurement data as transmitted are stored in the storage module 19 as a three-dimensional coordinate value represented by the distance measurement data, the second vertical angle data, and the horizontal angle data detected by the horizontal angle encoder 12.

The first control module 18 and the second control module 39 measure at least two reference measuring points by using the total station 3 and the two-dimensional laser scanner 4, respectively. The first control module 18 and the second control module 39 calculate a deviation amount of the axis 8a with respect to the second measuring reference point and the rotation irradiating plane of the two-dimensional laser scanner 4 based on each measurement result. Further, the first control module 18 performs the calibration of the total station 3 and the two-dimensional laser scanner 4 based on the deviation amount. A calibration result is stored in the storage module 19.

Further, based on the first distance measurement data measured by the total station 3, the first vertical angle data detected by the first vertical angle encoder 16, and the horizontal angle data detected by the horizontal angle encoder 12, the first control module 18 measures a three-dimensional coordinate of a predetermined measuring point. Further, the second control module 39 performs the control for the acquisition of the point cloud data of the two-dimensional laser scanner 4 and also performs the control of the horizontal rotation motor 11. The cooperation between the vertical scanning performed by the two-dimensional laser scanner 4 and the horizontal rotation of the horizontal rotation motor 11 enables performing the two-dimensional (two axes, that is, the horizontal axis and the vertical axis) scanning. The first control module 28 acquires the second vertical angle data of the scanning mirror 28, the second distance measurement data of the second distance measuring component 29, and the horizontal angle data of the horizontal angle encoder 12 by the two-dimensional scanning and the distance measurement for each pulsed light. Further, when the first control module 28 corrects the second vertical angle data, the horizontal angle data, and the second distance measurement data based on a calibration result, three-dimensional point cloud data corresponding to the object to be measured can be acquired. Further, the first control module 18 associates the three-dimensional point cloud data with the three-dimensional coordinate of each reference measuring pint measured by the total station 3.

Figure 2:
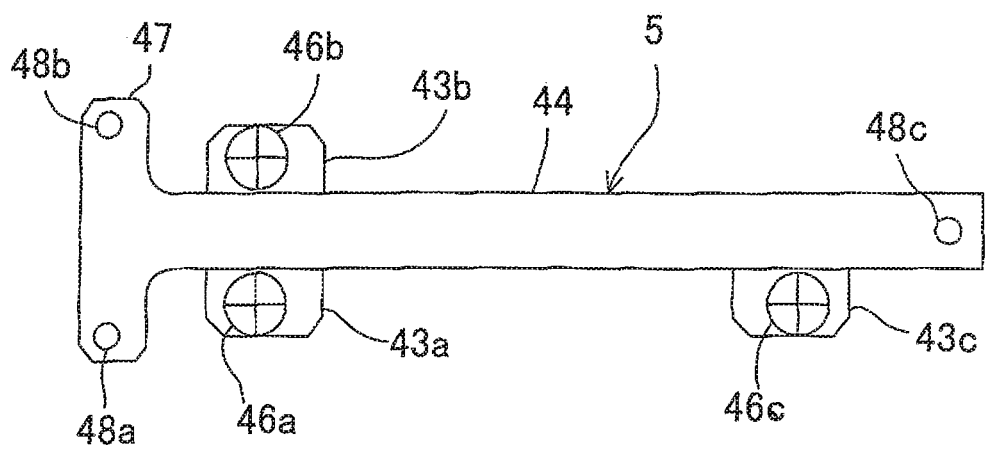
FIG. 2 is a plan view, showing a mounting base according to the first embodiment of the present invention.
Figure 3:
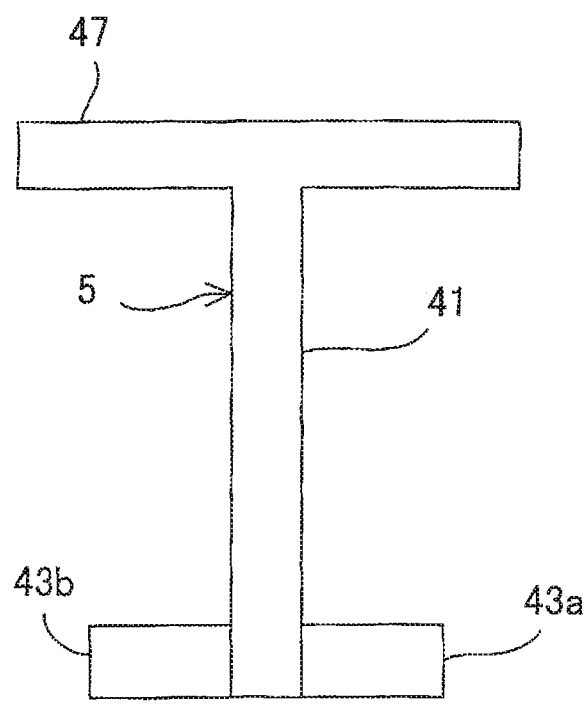
FIG. 3 is a side view showing the mounting base according to the first embodiment of the present invention.

Next, a description will be given on the mounting base 5 by referring to FIG. 1 to FIG. 3.

The mounting base 5 is made of a metal, and has an arch-like outer shape. The mounting base 5 has a tabular base unit 41 extending in a vertically lower direction, a cutaway portion 42 formed into an inverted-U-like shape from below at a central portion of the base unit 41, each flange 43 which is formed at a lower end of the base unit 41 and extends in the horizontal direction, and a tabular base plate 44 which is formed at an upper end of the base unit 41 and extends in the horizontal direction. The mounting base 5 has, for instance, a width which is equivalent to width of the total station 3 and the two-dimensional laser scanner 4.

The cutaway portion 42 has a shape and a size which prevent the telescope unit 17 and the base unit 41 from interfering with each other when the telescope unit 17 is vertically rotated.

Each flange 43 is formed in correspondence with each mounting pin 45. That is, at the positions corresponding to the three mounting pins 45a, 45b, 45c, the three flanges 43a, 43b, 43c are formed. The bolt holes (not shown) are formed in the flanges 43a, 43b, 43c. The fixed members 46, for instance, the bolts 46a, 46b, 46c are screwed into the screw holes of the mounting pins 45a, 45b, 45c via the bolt, holes, and the mounting base 5 is mounted on the total station 3. That is, the mounting base 5 is screwed to the total station 3 at three points.

It is to be noted that, the heights of the mounting pins 45a, 45b, 45c do not necessarily coincide with each other due to a manufacturing error or the like. In a case where the mounting base 5 is mounted to the total station 3 in this state, the mounting base 5 may be possibly deformed due to a difference in height of the mounting pins 45a, 15h, 45c.

In the first embodiment, since the mounting base 5 can be mounted on the total station 3 by the three-point support, an influence of the mounting base 5 based on a difference in height of the mounting pins 45a, 45b, 45c can be alleviated. Therefore, even if the four or more mounting pins 45 are provided to the total station 3, it is desirable to affect the three-point support with the use of the three mounting pins 45.

The base plate 44 is a tabular member having a T-like outer shape (planar shape). At one end portion of the base substrate 44, a mounted piece 47 extending in a direction orthogonal to a longitudinal direction of the base plate 44 is formed. At an other end portion of the base plate 44 and both the end portions of the mounted piece 47, the holes 48a, $^{4}$8b, 48c are formed, respectively.

The fixed members 49 like hexagon socket head cap bolts, for instance, the bolts 49a, 49b, 49c (FIG. 1 shows the bolts 49a and 49c alone) are screwed into the screw holes (not shown) formed in the base 32 via the holes 48a, 48b, 48c. As a result, the two-dimensional laser scanner 4 is mounted on the mounting base 5. That is, the two-dimensional laser scanner 4 is screwed to the mounting base 5 at three points.

The two-dimensional laser scanner 4 is mounted on the mounting base 5 by the three-point support. Therefore, even if the mounting base 5 does not have a perfect plane and the mounting base 5 is deformed, an influence on the base 32 based on a deformation of the mounting base 5 can be reduced.

It is to be noted that, in the first embodiment, a lower surface of the base 32 is thinned at a predetermined shape and a predetermined depth, a weight of the base 32 is decreased, and a reduction in rigidity of the base 32 is avoided. In the first embodiment, a material, a board thickness, and a thinned shape of the base 32 are taken into consideration, and the rigidity of the base 32 is higher than that of the mounting base 5. Therefore, even if the mounting base 5 is deformed, the base 32 can be mounted to the mounting base 5 by the three-point support with respect to the mounting base 5 and the low rigidity of the mounting base 5 without deforming the base 32.

Further, in the first embodiment, since the mounting pins 45a, 45b, 45c are used in common by a handle mounting seat, an upper end surface of each of these pins 45a, 45b, 45c are a flat surface. Therefore, even if the heights of the mounting pins 45a, 45b, 45c have an error, the mounting can be supported at three points, and the force acting on the mounting base 5 can be dispersed. For this reason, even if the mounting base 5 is inclined when the mounting base 5 is mounted, the deformation force with respect to the base 32 which is caused by the mounting is slight, and the deformation of the base 32 can be avoided.

A description will be given below on the measurement using the surveying instrument 1.

First, after the mounting base 5 is mounted on the total station 3, the two-dimensional laser scanner 4 is mounted on the mounting base 5, and the total station 3 and the two-dimensional laser scanner 4 are integrated.

At this time, the axis 8a of the horizontal rotation shaft 8 does not necessarily coincide with the second measuring reference point of the two-dimensional laser scanner 4. Therefore, as a preliminary step of the measurement using the surveying instrument 1, the total station 3 and the two-dimensional laser-scanner 4 must be calibrated so that a position (a stance) of the second measuring reference point with respect to the first measuring reference point can be known.

At least two reference measuring points are measured by the total station 3 and the two-dimensional laser scanner 4, respectively. That is, the total station 3 acquires the horizontal angle data, the first vertical angle data, and the first distance measurement data at each reference measuring point Further, the two-dimensional laser scanner 4 acquires the horizontal angle data, the second vertical angle data, and the second distance measurement data.

Based on a difference between the measurement results at the time of measuring at the respective reference measuring points, the first control module 18 calculates a deviation between the second measuring reference position and the axis 8a and a deviation between the axis 13a and the axis 24a with respect to the parallel direction. Based on the deviation amount and inclination amount as calculated, the first control module 18 calculates a position of the second measuring reference point of the two-dimensional laser scanner 4 with respect to the first measuring reference point of the total station 3 and a deviation between the axis 13a and the axis 24a with respect to the parallel direction. As a result, the calibration of the total station 3 and the two-dimensional laser scanner 4 is completed.

After the completion of the calibration, an information and data required for the measurement are input from the operation unit 21. The first control module 18 transmits a control signal to each of the horizontal rotation motor 11, the first vertical rotation motor 15, and the first distance measuring component in correspondence with the input information or the data.

The cooperation between the horizontal rotation of the first frame 7 and the vertical rotation of the telescope unit 17, the sighting telescope 10 to be directed at a predetermined measuring point, and the predetermined measuring point is sighted by the sighting telescope 10. The first distance measuring light is projected the measuring point via the sighting telescope 10, and the distance measurement of the measuring point is performed. The first distance measurement data is input to the storage module 19, and stored in the storage module 19.

Further, a vertical angle is acquired at the time of sighting the measuring point is detected by the first vertical angle encoder 16, and a horizontal angle is acquired at the time of sighting the measuring point is detected by the horizontal angle encoder 12. The first vertical angle data and the horizontal angle data as detected are stored in the storage module 19. Further, the first distance measurement data, the horizontal angle data, and the first vertical angle data are associated with each other.

The first control module 18 can calculate a three-dimensional coordinate of the measuring point based on the first distance measurement data of the measuring point as stored in the storage module 19 and the first vertical data and the horizontal angle data at the time of performing the distance measurement. Alternatively, the first control module 18 can calculate a three-dimensional coordinate of the measuring point based on the first distance measurement data and the first vertical angle data and the horizontal angle data at the time of performing the distance measurement. The three-dimensional coordinate as calculated is stored in the storage module 19.

Next, a description will be given on a case where the three-dimensional point cloud data of the object to be measured is acquired with the use of the two-dimensional laser scanner 4.

In a state where the second distance measuring light which is the pulsed light is emitted from the second distance measuring component 29, the scanning mirror 28 is rotated around the axis 24a as the center of the second vertical rotation shaft 24 by the second vertical rotation motor 26. Further, the second frame 23 (the first frame 7) is horizontally rotated by the horizontal rotation motor 11.

By the cooperation between the vertical rotation of the scanning mirror 28 and the horizontal rotation of the first frame 7, the second distance measuring light is scanned in two directions, that is, the vertical direction and horizontal direction.

The distance measurement is performed in accordance with each one pulsed light of the second distance measuring light, and a vertical angle and a horizontal angle are detected in accordance with one each pulsed light. Based on the second distance measurement data and the second vertical angle data for each one pulsed light, a two-dimensional coordinate within a vertical plane is acquired. Further, the horizontal angle data is detected in synchronization with the two-dimensional coordinate and the distance measurement. Based on the second distance measurement data, the second vertical angle data, and the horizontal angle data, a three-dimensional coordinate at each measuring point is acquired. Further, when the second distance measuring light is scanned at two-dimensional, that is, vertical direction and horizontal direction, the three-dimensional point cloud data can be acquired.

It is to be noted that, a position (a distance) of the second measuring reference point of the two-dimensional laser scanner 4 with respect to the first measuring reference point of the total station 3 is known based on the calibration previously performed before the measurement.

Therefore, based on a positional relationship between the first measuring reference point and the second measuring reference point and the second vertical angle data of the scanning mirror 28, a coordinate system of the two-dimensional laser scanner 4 can be transformed into a coordinate system of the total station 3 by the first control module 18. As a result, each two-dimensional coordinate acquired by the two-dimensional laser scanner 4 may perform the coordinate transformation so that a three-dimensional coordinate at each measuring point can be acquired.

As described above, in the first embodiment, the arch-like mounting base 5 is mounted on the upper surface of the total station 3 by the three-point support. Therefore, the opened upper portion of the total station 3 is closed with the mounting base 5, the first frame 7 and the mounting base 5 are formed a closed frame, and hence the rigidity of the total station 3 can be improved.

Further, the mounting base 5 is mounted on the total station 3 via the preset mounting pins 45. Therefore, a structure to mount the mounting base 5 with respect to the total station 3 does not have to be additionally provided, and a manufacturing cost can be reduced. Further, the mounting base 5 can be easily mounted, and the total station 3 and the two-dimensional laser scanner 4 can be easily integrated.

Further, the mounting base 5 has the base unit 41 which extends in the vertical direction and the base plate 44 which extends in the horizontal direction. That is, the vertical base unit 41 is fixed with respect to the horizontal base plate 44. Therefore, the base unit 41 functions as a web, and the flexural rigidity of the mounting base 5 can be improved.

Further, the mounting base 5 is supported by the total station 3 at three points, and the two-dimensional laser scanner 4 is supported by the mounting base 5 at three points. Therefore, a deformation of the mounting base 5 based on a difference in height of the mounting pins 45a, 45b, 45c can be reduced, an influence on the base 32 based on the deformation of the mounting base 5 can be decreased, and a deformation of the base 32 can be suppressed.

Further, in the first embodiment, as the preliminary step of performing the measurement by using the surveying instrument 1, the first measuring reference point of the total station 3 and the second measuring reference point of the two-dimensional laser scanner 4 are calibrated by the first control module 18. Therefore, even if the axis 8a does not coincide with the second measuring reference point and the axis 13a does not coincide with the axis 24a, a deviation between the first measuring reference point and the second measuring reference point can be corrected by an arithmetic operation. For this reason, the mounting base 5 does not have to be highly-accurately manufactured, and a manufacturing cost can be reduced. Further, since an assembling accuracy of the total station 3 and the two-dimensional laser scanner 4 does not have to be increased, the workability can be improved.

It is to be noted that, in this embodiment, the mounting base 5 is made of a metal. On the other hand, the mounting base 5 may be made of any other material as long as it is a material having the rigidity lower than the rigidity of the base 32, for instance, a synthetic resin and the like.

Figure 4:
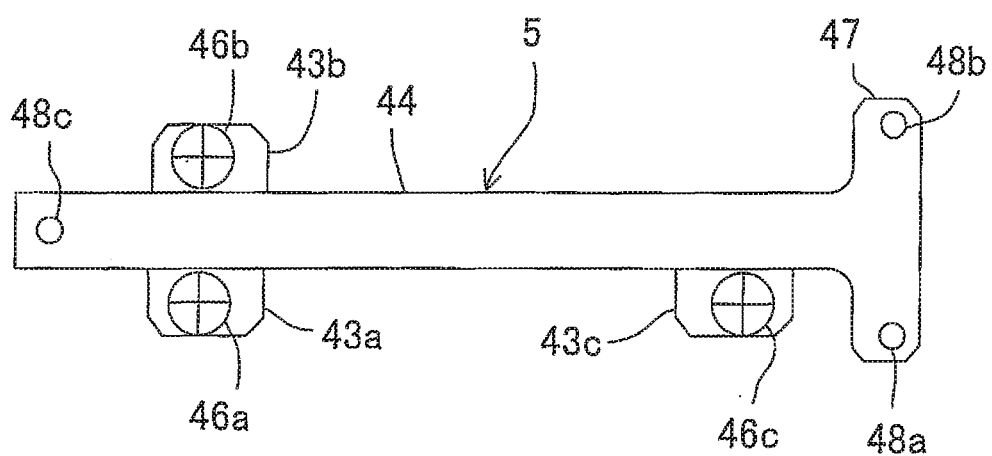
FIG. 4 is a plan view showing a modified example of the mounting base according to the first embodiment of the present invention.

FIG. 4 is a modified example of the mounting base 5 according to the first embodiment. In the modified example, a direction along which the mounting base 5 is screwed to the total station 3 at two point is different from a direction along which the two-dimensional laser scanner 4 is screwed to the mounting base 5 at two points. Adopting such a structure enables dispersing a deformation of the mounting base 5 based on a difference in height of the mounting pins 45a, 45b, 45c. Further, the stability at the time of mounting the two-dimensional laser scanner 4 can be improved.

It is to be noted that, each of the mounting pins 45a, 45b, 45c may be substituted by a counterpart having a spherical upper surface. When the mounting pins 45a, 45b, 45c each having the spherical upper surface are adopted, a deformation near the bolts 46a, 46b, 46c can be prevented from being produced when the bolts 46a, 46b, 46c are tightened.

Further, a seat which one of the surface is spherical surface may be interposed between the base plate 44 and the base 32. When the seat is interposed, a deformation of the bolts 49a, 49b, 49c can be prevented from being produced when the bolts 49a, 49b, 49c are tightened.

Figure 5:
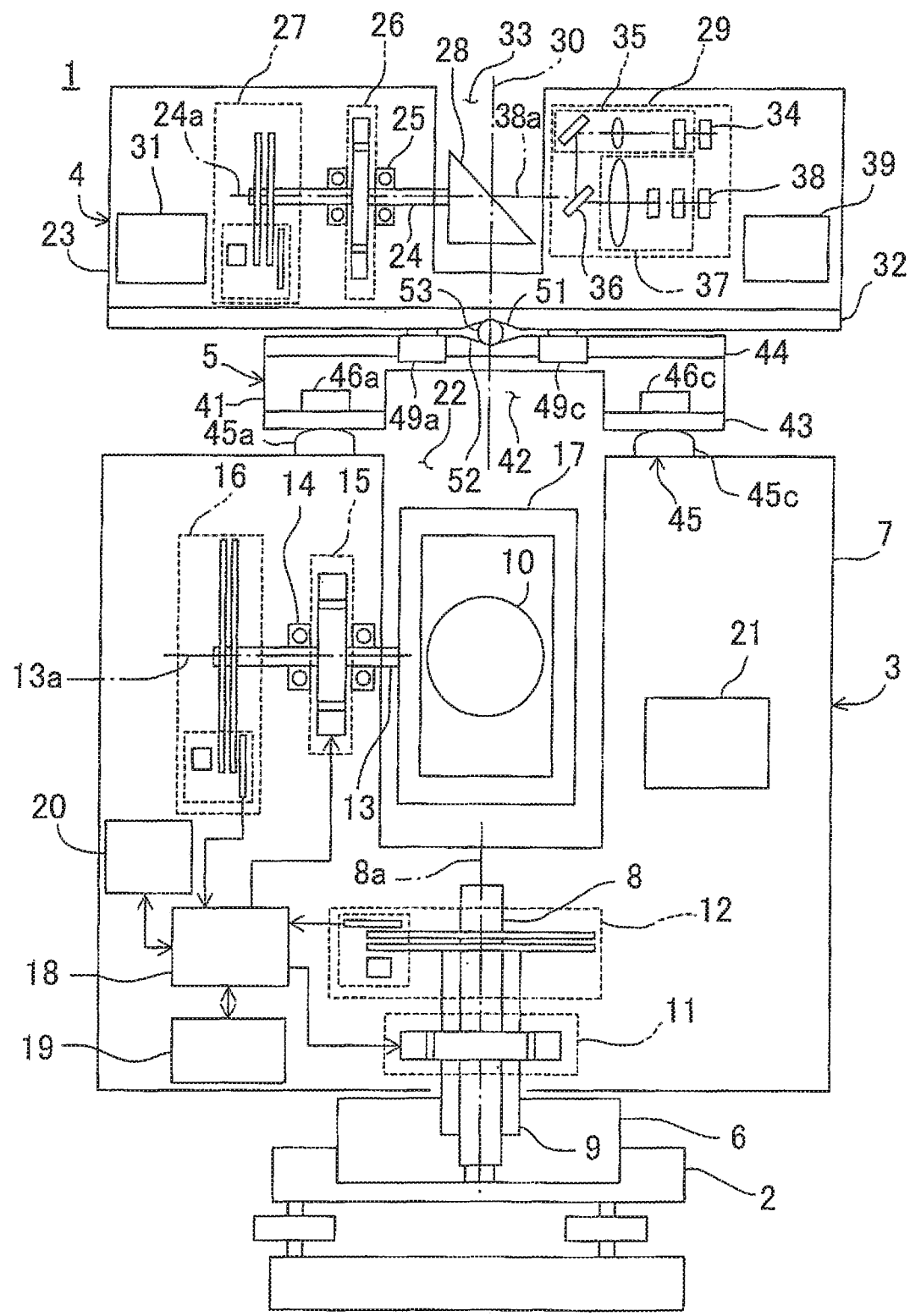
FIG. 5 is a front view showing a surveying instrument according to a second embodiment of the present invention.
Figure 6:
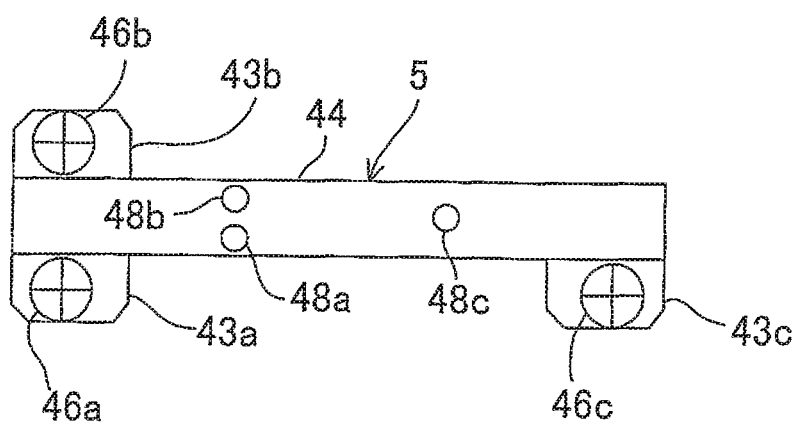
FIG. 6 is a plan view sowing a mounting base according to the second embodiment of the present invention.

Next, referring to FIG. 5 and FIG. 6, a description will be given on a second embodiment of the present invention. It is to be noted that, in FIG. 5 and FIG. 6, the same components as shown in FIG. 1 and FIG. 2 are referred by the same symbols, and a detailed description thereof will be omitted.

In the second embodiment, a width of a mounting base 5 is smaller than widths of a total station 3 and a two-dimensional laser scanner 4. Further, each of a mounting pins 45a, 45b, 45c has a spherical upper surface.

Further, in the second embodiment, holes 48a, 48b, 48c are formed at the positions close to a central side rather than bolts 46a, 46b, 46c. The two-dimensional laser scanner 4 is mounted on the mounting base 5 by bolts 49a, 49b, 49c (in FIG. 5, the bolts 49a and 49c alone are shown) via the holes 48a, 48b, 48c. It is to be noted that, in the second embodiment, the two-dimensional laser scanner 4 is supported by the mounting base 5 at three points.

At a central portion of a lower surface of a base 32, a receiving hole 51 having, for instance, a conical shape is formed. Further, at a central portion of an upper surface of a base plate 44, a receiving hole 52 having, for instance, a conical shape is formed. Further, a spherical shaft member 53 is interposed between the receiving hole 51 and the receiving hole 52. The receiving hole 51 and the receiving hole 52 are formed between the bolts 49a, 49b, 49c. That is, the bolts 49a, 49b, 49c are screwed to the base 32 with the shaft member 53 sandwiched.

In the second embodiment, the spherical shaft member 53 is interposed between the two-dimensional laser scanner 4 and the mounting base 5. Therefore, an influence with respect to the two-dimensional laser scanner 4 based on an inclination or a deformation of the mounting base 5 as produced can be reduced.

Further, the shaft member 53 is placed in the receiving hole 51, and the two-dimensional laser scanner 4 is mounted on the mounting base 5 in such a manner that the shaft member 53 is placed in the receiving hole 52. Therefore, the two-dimensional laser scanner 4 can be easily positioned, and the workability can be improved.

It is to be noted that, in the second embodiment, likewise, a mounted piece 47 (see FIG. 2) may be formed and the holes 48a and 48b may be formed at both the end portions of the mounted piece 47. When the mounted piece 47 is formed, the stability of the two-dimensional laser-scanner 4 can be improved.

Further, in the first embodiment and the second embodiment, the mounting base 5 is mounted on the total station 3 via the preset mounting pins 45. Therefore, a structure for additionally mounting a handle with respect to the mounting base 5 may be added, and the handle may be mounted on the mounting base 5.

The invention claimed is:

1. A surveying instrument comprising: a total station, a mounting base which is fixed on an upper surface of said total station at three points, and a two-dimensional laser scanner which is fixed on an upper surface of said mounting base at three points, wherein said total station comprises a horizontal rotation driving unit for horizontally rotating said total station around a vertical axis as a center, a horizontal rotation detector for detecting a horizontal angle of said total station, a telescope unit incorporating a first distance measuring component for sighting a predetermined measuring point, emitting a first distance measuring light, and performing a distance measurement, a first vertical rotation driving unit for vertically rotating said telescope unit around a horizontal axis as the center, a first vertical angle detector for detecting a vertical angle of said telescope unit, and a control module, wherein said control module is configured to perform a three-dimensional measurement of said measuring point based on a distance measurement result, a detection result of said horizontal rotation detector, and a detection result of said first vertical angle detector, wherein said two-dimensional laser scanner comprises a base, a second distance measuring component which is provided on said base for emitting the second distance measuring light, and performing said distance measurement, a scanning mirror for deflecting said second distance measuring light within a vertical plane, a second vertical rotation driving unit for vertically rotating said scanning mirror around a horizontal axis as the center, and a second vertical angle detector for detecting a vertical angle of said scanning mirror, wherein said second distance measuring light is scanned by said scanning mirror, and point cloud data is acquired along a scanning line.

2. The surveying instrument according to claim 1, wherein said mounting base comprises a flange fixed to an upper surface of said total station on a lower side and a base plate fixed to said two-dimensional laser scanner on an upper side, wherein said mounting base is configured with the low rigidity with respect to said base.

3. The surveying instrument according to claim 2, wherein one of the left and the right of said flange is fixed to two points, the other of the left and the right of said flange is fixed to one point, one of the left and the right of said base plate is fixed to one point, and the other of the left and the right said base plate is fixed to two points.

4. The surveying instrument according to claim 3, wherein a conical receiving hole is formed in each of a central portion of an upper surface of said base plate and a central portion of a lower surface of said base, a spherical shaft member is interposed between said receiving holes, and said base plate and said base are fixed at three points with said shaft member sandwiched.

5. The surveying instrument according to claim 4, wherein said mounting base is fixed to a mounting pin protruded on said upper surface of said total station, and an upper surface of said mounting pin is formed into a spherical surface.

6. The surveying instrument according to claim 5, wherein said control module allows said total station and said two-dimensional laser scanner to measure at least two reference measuring points respectively, and is configured to calibrate said total station and said two-dimensional laser scanner based on said measurement results of said reference measuring points.

7. The surveying instrument according to claim 4, wherein said control module allows said total station and said two-dimensional laser scanner to measure at least two reference measuring points respectively, and is configured to calibrate said total station and said two-dimensional laser scanner based on said measurement results of said reference measuring points.

8. The surveying instrument according to claim 3, wherein a seat is interposed and bolted between said base and said base plate, and one surface of said seat is formed into a spherical surface.

9. The surveying instrument according to claim 8, wherein said control module allows said total station and said two-dimensional laser scanner to measure at least two reference measuring points respectively, and is configured to calibrate said total station and said two-dimensional laser scanner based on said measurement results of said reference measuring points.

10. The surveying instrument according to claim 3, wherein said mounting base is fixed to a mounting pin protruded on said upper surface of said total station, and an upper surface of said mounting pin is formed into a spherical surface.

11. The surveying instrument according to claim 10, wherein said control module allows said total station and said two-dimensional laser scanner to measure at least two reference measuring points respectively, and is configured to calibrate said total station and said two-dimensional laser scanner based on said measurement results of said reference measuring points.

12. The surveying instrument according to claim 3, wherein said control module allows said total station and said two-dimensional laser scanner to measure at least two reference measuring points respectively, and is configured to calibrate said total station and said two-dimensional laser scanner based on said measurement results of said reference measuring points.

13. The surveying instrument according to claim 2, wherein said mounting base is fixed to a mounting pin protruded on said upper surface of said total station, and an upper surface of said mounting pin is formed into a spherical surface.

14. The surveying instrument according to claim 13, wherein said control module allows said total station and said two-dimensional laser scanner to measure at least two reference measuring points respectively, and is configured to calibrate said total station and said two-dimensional laser scanner based on said measurement results of said reference measuring points.

15. The surveying instrument according to claim 2, wherein said control module allows said total station and said two-dimensional laser scanner to measure at least two reference measuring points respectively, and is configured to calibrate said total station and said two-dimensional laser scanner based on said measurement results of said reference measuring points.

16. The surveying instrument according to claim 1, wherein said mounting base is fixed to a mounting pin protruded on said upper surface of said total station, and an upper surface of said mounting pin is formed into a spherical surface.

17. The surveying instrument according to claim 16, wherein said control module allows said total station and said two-dimensional laser scanner to measure at least two reference measuring points respectively, and is configured to calibrate said total station and said two-dimensional laser scanner based on said measurement results of said reference measuring points.

18. The surveying instrument according to claim 1, wherein said control module allows said total station and said two-dimensional laser scanner to measure at least two reference measuring points respectively, and is configured to calibrate said total station and said two-dimensional laser scanner based on said measurement results of said reference measuring points.

19. A method for assembling a total station and a two-dimensional laser scanner comprising: having a total station, a mounting base fixed on an upper surface of said total station at three points, and a two-dimensional laser scanner fixed on an upper surface of said mounting base at three points, measuring at least two reference measuring points by said total station, measuring said two reference measuring points by said two-dimensional laser scanner, obtaining a difference between a measurement result of said two reference measuring points measured by said total station and a measurement result of said two reference measuring points measured by said two-dimensional laser scanner, and calibrating said total station and said two-dimensional laser scanner based on said difference.

* * * * *